United States Patent
Liu

(10) Patent No.: US 8,073,482 B2
(45) Date of Patent: Dec. 6, 2011

(54) MOBILE PHONE WITH OPTIONAL AUDIO OUTPUT FUNCTION

(75) Inventor: Guo-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 532 days.

(21) Appl. No.: 12/330,570

(22) Filed: Dec. 9, 2008

(65) Prior Publication Data

US 2009/0298552 A1    Dec. 3, 2009

(30) Foreign Application Priority Data

May 28, 2008  (CN) .......................... 2008 1 0301799

(51) Int. Cl.
*H04M 1/00* (2006.01)

(52) U.S. Cl. .................................. 455/550.1; 455/569.1

(58) Field of Classification Search .................. 455/149, 455/550.1, 557, 569.1, 569.2
See application file for complete search history.

(56) References Cited

U.S. PATENT DOCUMENTS 7,103,393 B2 * 9/2006 Hwang ....................... 455/569.1
7,317,932 B2 * 1/2008 Lai et al. ..................... 455/556.1

* cited by examiner

*Primary Examiner* — Jeffrey Zweizig
(74) *Attorney, Agent, or Firm* — Altis Law Group, Inc.

(57) ABSTRACT

A mobile phone includes an audio signal generating module, a first audio output module, a second audio output module, an output mode setting module, and an audio signal controlling module. The audio signal generating module generates audio signal corresponding to a status of the phone. The output mode setting module sets a mode of outputting audio. The audio signal controlling module monitors the mode set by the output mode setting module, and switches on the corresponding audio output module to output audio corresponding to the audio signal.

7 Claims, 2 Drawing Sheets

MOBILE PHONE WITH OPTIONAL AUDIO OUTPUT FUNCTION

BACKGROUND

1. Technical Field

The present disclosure relates to audio output functions of a mobile phone.

2. Description of Related Art

It is now common for mobile phones to have many functions besides placing and receiving calls. One popular function is to listen to music. If a mobile phone user is listening to music from their phone over earphones, the user might not hear an incoming call or message signals.

Therefore, a phone which overcomes the above-described deficiency is desired.

DETAILED DESCRIPTION

Figure 1:
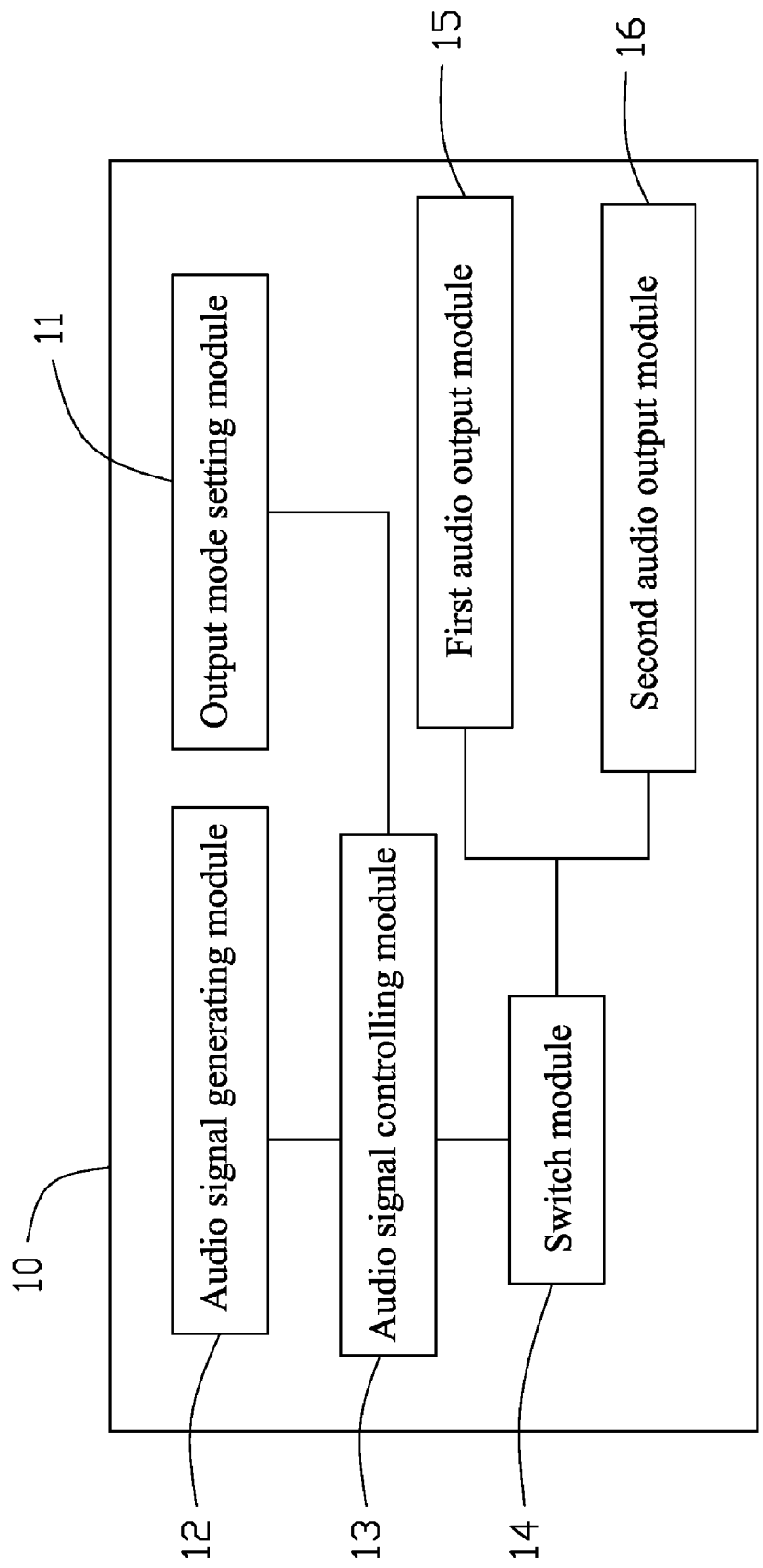
FIG. 1 is a block diagram of an embodiment of a mobile phone.

Referring to FIG. 1, an embodiment of a mobile phone 10 includes an output mode setting module 11, an audio signal generating module 12, an audio signal controlling module 13, a switch module 14, a first audio output module 15, and a second audio output module 16.

The output mode setting module 11 is configured to be set into a first audio output mode corresponding to the first audio output module 15, and a second audio output mode corresponding to the second audio output module 16.

The audio signal generating module 12 is used to generate audio signals corresponding to different statuses of the phone 10. For example, when the phone 10 receives a call, the audio signal generating module 12 generates an audio signal which cause the phone to output an audible signal that signifies an incoming call. When the phone 10 receives a short message, the audio signal generating module 12 generates a different audio signal which causes the phone to output a different audible signal that signifies a message has been received. In addition, the audio signal generating module 12 can generate audio signals corresponding to other kinds of statuses of the phone, such as for an alarm clock function, and so on.

The audio signal controlling module 13 is connected to the audio signal generating module 12 and the output mode setting module 11. The audio signal controlling module 13 monitors the setting of the output mode setting module 11, and controls the switch module 14 to connect to the corresponding audio output module 15, 16.

In one embodiment, the first audio output module 15 is a loudspeaker, and the second audio output module 16 is an earphone inserted in the mobile phone 10.

Figure 2:
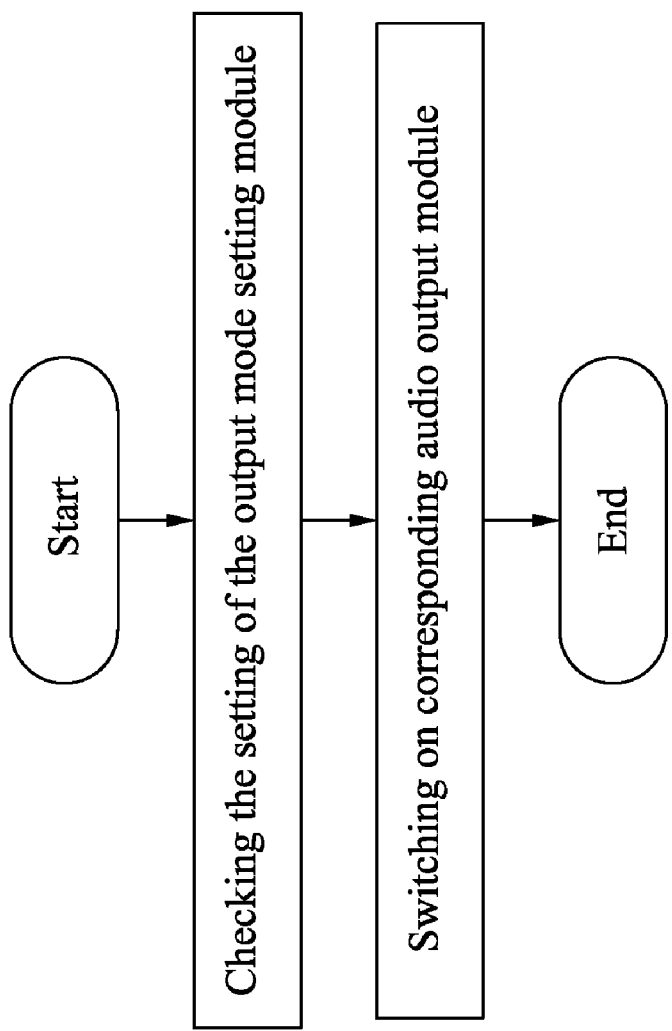
FIG. 2 is a flow chart of the mobile phone of FIG. 1.

Referring to FIG. 2, if a user is listening to music from the phone 10 using an earphone connected to the earphone jack, the user can set the output mode setting module 11 to the second audio output mode. When there is a call, the audio signal generating module 12 generates a corresponding audio signal. The audio signal controlling module 13 checks the setting of the output mode setting module 11, and then controls the switch module 14 to switch to the second audio output module 16. An audible signifying an incoming call may then be outputted via the earphone to the user.

In one embodiment, the audio signal controlling module 13 can also control the switch module 42 to switch to the first audio output module 15 and the second audio output module 16 simultaneously. Therefore, audible signals can be outputted via the first and second audio output modules 15, 16 simultaneously.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts to the full extent indicated by the broad general meaning of the terms in which the appended claims are expressed.

What is claimed is:

1. A mobile phone, comprising:
    an audio signal generating module configured to generate audio signals corresponding to a status of the phone;
    a first audio output module and a second audio output module configured to output audio corresponding to the audio signals;
    an output mode setting module configured to set a mode of outputting audio; and
    an audio signal controlling module configured to monitor the modes set by the output mode setting module, and switch on corresponding audio output module to output the audio; and
    a switch module controlled by the audio signal controlling module to alternatively switch on a corresponding audio output module.

2. The mobile phone of claim 1, wherein the first audio output module is a loudspeaker, and the second audio output module is an earphone inserted in the mobile phone.

3. The mobile phone of claim 2, wherein the modes of outputting audio comprise outputting audio by the first audio output module, outputting audio by the second audio output module, and outputting audio by both the first and second audio output modules.

4. The mobile phone of claim 1, wherein the status of the phone comprises receiving one of a call, a short message, an alarm, and a radio.

5. A method comprising:
    providing a mobile phone comprising an audio signal generating module, a first audio output module, a second audio output module, an output mode setting module, and an audio signal controlling module;
    setting a mode of outputting audio by the output mode setting module;
    monitoring the modes set by the output mode setting module, and switching on corresponding audio output module by the audio signal controlling module;
    generating audio signals corresponding to a status of the phone by the audio signal generating module, where the status of the phone comprises receiving one of a call, a short message, a watch alarm, and a radio; and
    outputting voice by a corresponding audio output module.

6. The method of claim 5, wherein the first audio output module is a loudspeaker, and the second audio output module is an earphone inserted in the mobile phone.

7. The method of claim 6, wherein the modes of outputting audio comprise outputting audio by the first audio output module, outputting audio by the second audio output module, and outputting audio by both the first and second audio output modules.

* * * * *